Figure 1:
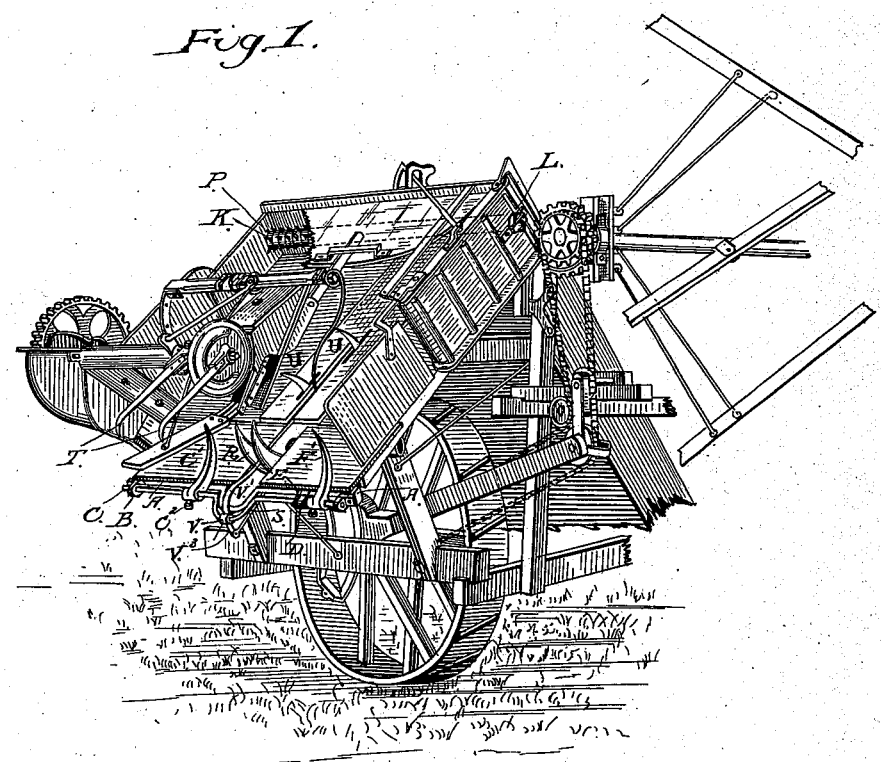

(No Model.)  3 Sheets—Sheet 1.

J. BACHMAN.
HARVESTER AND BINDER.

No. 382,677.  Patented May 15, 1888.

Witnesses.
T. W. Fowler
D. S. Clark

Inventor
Jacob Bachman,
By his Attorney
Thomas P. Kinsey (No Model.) 3 Sheets—Sheet 2.
J. BACHMAN.
HARVESTER AND BINDER.
No. 382,677. Patented May 15, 1888.
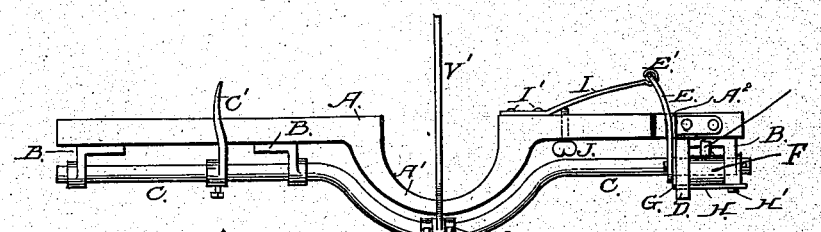
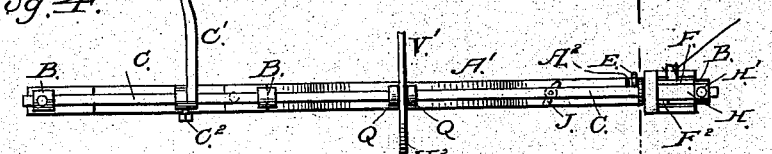
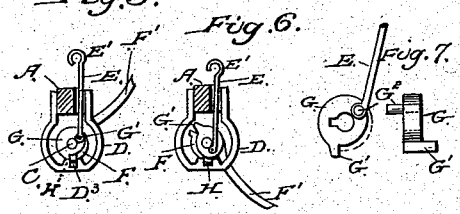
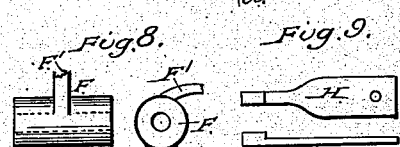
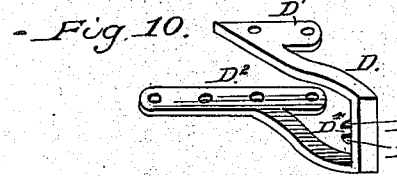
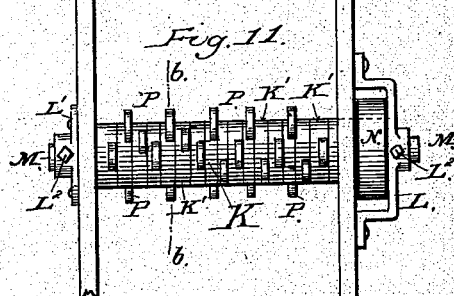
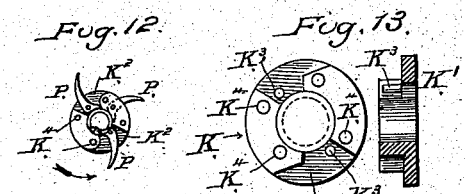
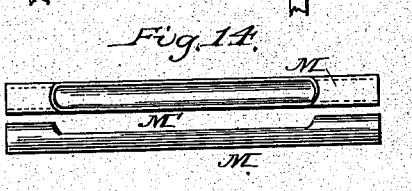
Witnesses:
T. W. Fowler
D. S. Clark
Inventor:
Jacob Bachman
By his Attorney
Thomas P. Kinsey (No Model.)
3 Sheets—Sheet 3.
J. BACHMAN.
HARVESTER AND BINDER.
No. 382,677. Patented May 15, 1888.
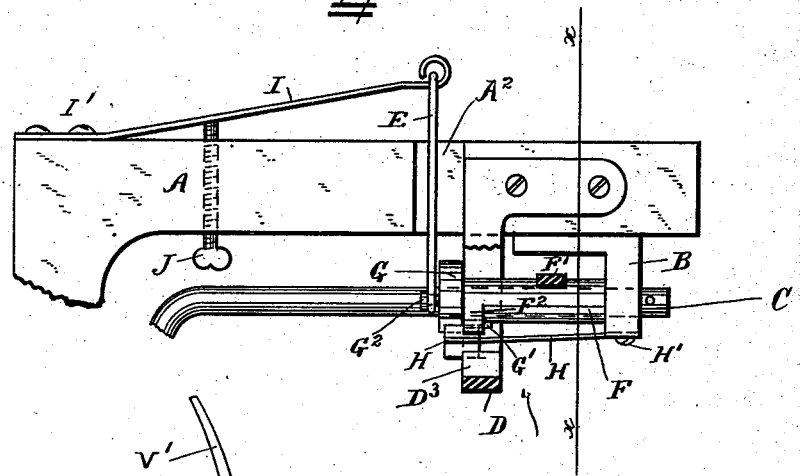
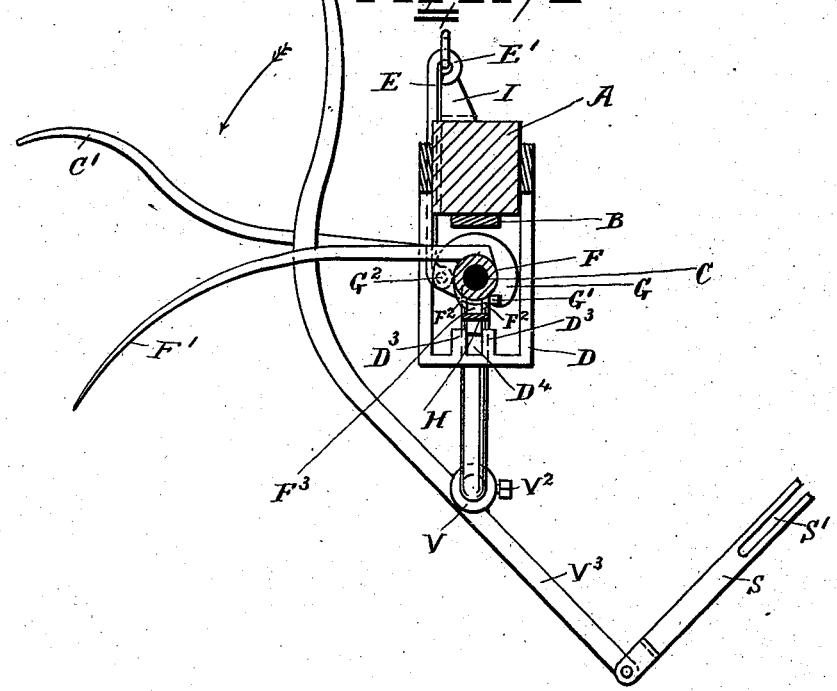
Witnesses.
W. D. Porter.
L. B. Porter.
Inventor,
Jacob Bachman.
By his Attorney,
Herbert W. T. Jenner.

UNITED STATES PATENT OFFICE.

JACOB BACHMAN, OF STONY RUN, PENNSYLVANIA.

HARVESTER AND BINDER.

SPECIFICATION forming part of Letters Patent No. 382,677, dated May 15, 1888.

Application filed October 12, 1886. Serial No. 215,983. (No model.)

*To all whom it may concern:*

Be it known that I, JACOB BACHMAN, a citizen of the United States, residing at Stony Run, county of Berks, State of Pennsylvania, have invented a new and useful Improvement in Harvesters and Binders, of which the following is a specification.

This improvement is more particularly related to devices in combination with the binding-deck, whereby the tangling of the grain around the upper delivery-rolls of the elevator is prevented, and whereby the sheaf after being bound is automatically dumped from the same in a uniform manner.

Experts in the use of self-binding harvesters are aware that frequently the grain as it is carried from the platform up to the binding-deck between the upper and lower aprons, particularly when the grain as harvested is in a tangled condition, will, instead of dropping out from between the aprons upon the binding-deck, continue its movement and pass over the top roller on its way out of the machine, and, clogging over the roll, prevent the operation of the machine, which must be stopped and the clogged grain removed. They are also aware of the difficulty connected with the discharge of the bound sheaves from the same cause, (tangled grain,) which frequently hang at one end, and in consequence drop upon the field in a very irregular manner.

My improvement shown in the drawings accompanying this specification and forming a part of the same shows very fully my mode of overcoming the above objectionable features of the modern combined harvester and binder, like letters of reference indicating similar parts.

Figure 2:
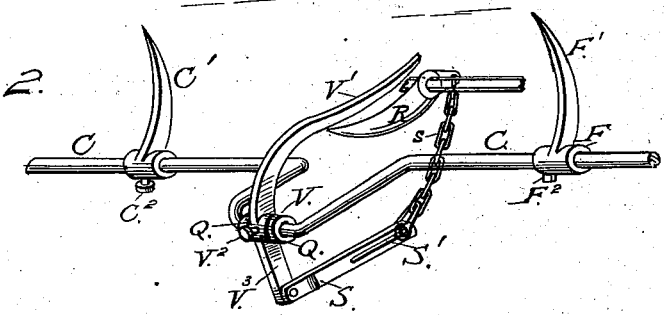

Figure 1 is a perspective view of a portion of a combined harvester and binder, showing my improvements attached thereto; Fig. 2, a representation of the automatic dumping-shaft detached from the machine and connected to the trip mechanism. Fig. 3 represents in plan my automatic sheaf-dumper, which is secured to the under side of the binding-deck at the discharge end of the same, Fig. 4 being a front elevation of the same, Fig. 5 representing a cross-section on the line *a a* of Fig. 4, with the abutment-arm in its normal position prior to the sheaf being forced against the same, Fig. 6 representing the abutting arm after its release from the lock of the yoke and the discharge of the sheaf; Fig. 7, a plan and an elevation of the releasing-cam, on an enlarged scale, showing its returning lug and pin for connection with the operating-spring; Fig. 8, an elevation and an end view of the abutment-arm sleeve, with its locking parts and portion of arm. Fig. 9 represents in plan and a side elevation of the locking-spring which retains the sleeve and abutment-arm in the position shown in Figs. 2, 3, and 4 until released by the cam; Fig. 10, a perspective view of the yoke detached from the frame. Fig. 11 represents in plan my improved stripper or belt-clearer, which is placed in the upper portion of the binding-deck in such a position relative to the delivering-aprons that the teeth of the stripper as the same is revolved shall catch the grain as it attempts to follow the apron over the upper roller and gather the same upon the binder-deck, the teeth being so arranged that as they revolve they shall protrude toward the apron and retract within the body of the cylinder as they leave the apron, thus leaving the grain seized by the teeth free to drop upon the binding-deck. Bearings are provided for the shaft outside of the frame, and a suitable driving-gear in connection with the cylinder to revolve the same. Fig. 12 represents a cross-section through the stripper on the line *b b* of Fig. 11, showing the teeth, shaft, and disks. Fig. 13 represents in elevation and plan one of the disks which, superimposed upon each other, serve to make up the length of the stripper-cylinder. Fig. 14 is a plan and side elevation of the hollow shaft, which is securely held in bearings and upon which the stripper-cylinder as a whole revolves; Fig. 15, a cross-section of the hollow shaft with the stripper or disentangling teeth shown in the positions they automatically assume as the stripper-cylinder is revolved upon the fixed shaft. Fig. 16 is an enlarged plan view of one end of the bundle-discharger with a portion of the yoke broken away. Fig. 17 is an end view of the bundle-discharger, taken on line *x x* in Fig. 16.

A represents a supporting-frame for the sheaf-dumper, secured to the outer side of the binder-table, and which is preferably made in one integral piece, a bow-space, A', permitting its attachment to the lower face of the binding-deck at the discharge end of the same without interfering with the operation of the usual binding machinery. To this frame suitable brackets, B, are secured, in which is supported a dumping-shaft, C, bent to conform to the shape of the frame A, as shown in Fig. 3. A yoke, D, having a single arm, D', and a double arm, D², with lugs D³, forming a recess, D⁴, is secured also to the frame A, with the single arm D' uppermost, and the edge of the same in line with a transverse notch, A², provided in the frame A for the passage of the connecting-rod E to the inside of the frame. A sleeve, F, of suitable length abuts against the end bearing, B, on the right and against a cam, G, on the left, and is bored to revolve freely upon the shaft C. An abutment-arm, F', is secured to or made integral with the sleeve, and is formed in length and contour so as to conform to that of the bound sheaf, said sheaf being pressed against the same by the discharge-arms T. Lugs F² are provided at one end of the sleeve next to the cam, separated from each other to form a recess, F³, which in the normal state of the device embraces the spring H, which is enlarged for that purpose at one end, and has its other end secured to the bearing B by bolt H', and is thus locked in place.

The cam G is securely fixed upon the dumping-shaft C in free contact with the sleeve F, which is journaled loose upon the shaft. The cam G is provided with a side projecting lug, G', which clears the periphery of the sleeve and engages with one of the lugs F². The cam is further provided with a pin, G², whereby connection is made with the rod E, the opposite end of said rod being connected by a hook-joint, E', with a flat spring, I, secured by screws I' to the back of the frame A. A set-screw, J, is screwed from the front through the frame, with its point in contact with the flat spring I, whereby the resistance of the spring to the rotation of the cam G may be increased or diminished by manipulating said screw.

Upon the opposite end of the dumping shaft, and intermediate to the bearings B, a second abutting-arm, C', is adjustably secured in place thereon by a set-screw, C²; and central to the curve of the shaft C an arm, V', is secured by a set-screw, V², in its hub V. Collars Q may be placed upon each side of the hub V and secured thereto by set-screws, the hub being adjustable upon the shaft between the same. A tail, V³, projected downward and connected with the trip-fingers R R by a link, S, having a slot, S', serves to secure an automatic reversal of the arm V', said arm in its normal position lying between the trip-fingers R, the bars of which, as they descend to carry their heads below the binding-deck of the machine, will, just before reaching their point of rest, operate upon the link S and forcibly pull upon the tail V³, and thus draw around the arm V', lifting the sheaf clear of the deck and depositing the same upon the field.

The connection of the link S with the trip mechanism is shown in Fig. 2, in which the trip-fingers (only one of which is shown) have moved downward far enough from their normal position, which is shown in Fig. 1, to permit the sheaf to slide down upon the arm V' and rest against the arms C' F', the sliding movement of the said sheaf being occasioned by the pressure of the material behind it. The pin at the end of the chain s, or other flexible connection which will communicate the motion of the parts, has slid along the slot S' during the downward movement of the trip-fingers, and the continued movement of the said fingers causes the said pin to pull upon the end of the slot at the right moment for the discharging mechanism to be put in operation, as hereinafter more fully described.

At the upper end of the binder-deck, within the frame-work and in the vicinity of the elevating-aprons, I place a transverse cylinder, K, perforating the sides of the frame to the diameter of said cylinder for the purpose of introducing the same into place. Bearings L L' support the ends of a fixed shaft, M, held securely therein by set-screws L², and the cylinder K revolves freely thereon. A pulley or gear, N, between the frame and bearing L serves by connection with a suitable revolving portion of the machine to give motion to the cylinder.

The revolving cylinder K is composed of a series of disks, K', adapted by thickness of the several disks to fill out the desired length of cylinder, a portion of the same, as N, being increased or diminished in diameter, or has attached to it a gear or sprocket wheel, for the purpose of driving the same, as above described. The disks forming the working portion of the cylinder have recessed seats K², formed in one face of the same, as shown more clearly in Fig. 13, with pivots K³ therein, and equidistant clamping-bolt holes K⁴. Stripping-teeth P are pivoted in the recesses K² on the pivots K³, and are so arranged relative to the cylinder K and fixed shaft M as to automatically project and retract their points from the face of the cylinder as the same is revolved. This result is attained by the use of a hollow shaft, M, of a length sufficient to extend between the bearings, and which has its intermediate portion, M', which is coincident with the toothed portion of the cylinder, cut away upon its diametrical axial center, as shown in Fig. 14. A solid sectional shaft may be used, the cut-away portion being grooved longitudinally for about one-half its depth; but I give preference to a hollow shaft of gas-pipe or its equivalent as being more readily adapted thereto.

As the cylinder K is revolved with the feet P' of the stripper-teeth P in contact with the shell of the shaft M, the points of the teeth, from their feet passing from the uncut to the cut-away face of the same, and thereby dropping more or less within the shaft, assume, respectively, the positions shown more clearly in the skeleton view of Fig. 15, and thus dragging of the grain around the cylinder is prevented. The equidistant clamping-holes $K^4$ permit the shifting around of the disks $K'$ as they are strung upon the shaft, and thus bring the stripper-teeth P into action alternately and with a spiral movement relative to the periphery of the cylinder. The ends of the cylinder are recessed for the heads and nuts of the clamping-bolts, so as to have the same free of protruding points.

The operation of the devices is as follows: The grain carried up to the binding-deck is met at the discharging-point between the upper and lower aprons by the stripper-teeth P, which at that point protrude to their full extent from the cylinder K, and which, catching any grain following the upper apron above said point of discharge, will strip the same away, and deposit it upon the binding-deck within reach of the packers U U. The teeth, losing their foot-support as they pass toward the rear, fall within their respective recesses $K^2$, and the grain falls by gravity upon the deck. The usual packers, U U, are then brought into action in combination with the usual needle-arm, and the sheaf is made up and pressed to the rear by the dischargers T preparatory to a repetition of the operation. The result of this is that the consecutive sheaves as formed are pressed against the preceding ones, and they are successively discharged, under the old system, some with the butt, others with the head end, first striking the ground, while with tangled grain they very frequently hang and refuse to drop unless assisted by the driver.

In the use of my automatic dumper all uncertainty is done away with. The butt of the sheaf is pressed against the abutting arm $F'$, the head of the sheaf against the abutting arm $C'$, while the center of the sheaf lies upon the arm $V'$, placed between the trips R R, the pressure of the sheaf being continued by the efforts of the discharging-arms T to rid the binder-deck of the same. The force of the spring I is overcome, and the shaft C, being carried around by the arm $C'$, carries with it the cam G, which unlocks the spring H from the sleeve, raising it into the recess $D^4$ of the yoke, when the arm $F'$ drops until one of the projections $F^2$ of sleeve F strikes against the lug $G'$ of cam G. The spring H retains the sleeve F and its arm, and prevents that end of the sheaf from moving until the arms $C'$ and $V'$ have moved a considerable distance and the cam G has revolved sufficiently to raise the spring H out of the notch $F^3$ on the sleeve and into the guide-slot $D^4$ of the yoke. The arm $F'$ then moves suddenly before the sheaf, and its sudden movement is simultaneous with the following sudden movement of the arms $C'$ and $V'$. As the bent portion of the shaft passes downward it partially raises the sheaf by the arm $V'$, and at the same moment, the trip-fingers having descended to put the trips out of the way, the rod S, connecting the tail $V^3$ of the central arm, $V'$, receives a sudden pull from the trip-bar, with which it is loosely connected by the slot $S'$ and chain s, and the result is that the sheaf is thrown completed clear of the machine and uniformly upon the ground. The dumping of the sheaf having relieved the tension upon the spring I, it at once returns the shaft into position by its pull upon the pin $G^2$ of the cam G, and the lug $G'$ of the latter, in its return movement, presses against the lug $F^2$ of the sleeve F and returns the sleeve and its arm $F'$ into place for a repetition of the movement. The forward lug, $F^2$, lifts the spring H as it passes under the same, which is then again locked in the recess $F^3$. At the same time as the bent shaft with its fixed arm $C'$ is raised into its normal position it carries with it the central arm, $V'$, which rises above the frame A, when, being free and the tension of spring I now being only slight, it falls by gravity into its position between the trips R R, ready to receive the next formed sheaf and discharge the same from the binding-deck.

What I claim is—

1. In a harvester, the combination of the non-revolving delivery-cylinder shaft having its central portion cut away upon one side, the cylinder K, comprising a series of disks suitably connected together by bolts passing through holes $K^4$ and revolving upon the said shaft, and the stripping-teeth P, pivoted on pins projecting from the said disks and provided with heels $P'$, so that the teeth are pressed outward by the circumference of the shaft, substantially as and for the purpose set forth.

2. In a harvester, the combination of the tubular non-revolving delivery-cylinder shaft, having its central portion cut away on one side, the cylinder K, comprising a series of disks provided with recesses $K^2$ and pins $K^3$, the said pins in each disk being spirally in advance of the pins in the next disk, and the disks being connected together by bolts passing through holes $K^4$ and revolving upon the said shaft, and the stripping-teeth P, pivoted on the pins projecting from the said disks and provided with heels $P'$, so that the teeth are pressed outward by the circumference of the shaft, substantially as and for the purpose set forth.

3. In a harvester, the combination of a supporting-frame secured to the binding-deck, a shaft journaled in brackets projecting from the said frame, the arms $C'$ and $V'$, secured upon the said shaft, the arm $F'$, loose upon the shaft and having lugs $F^2$ upon its sleeve, the spring H, projecting between said lugs and retaining the arm in position, and a cam secured to the shaft for raising the spring and freeing the arm $F'$ when the shaft has partially revolved, substantially as and for the purpose set forth.

4. In a harvester, the combination of a supporting-frame secured to the binding-deck, a shaft journaled in brackets projecting from the said frame, the arms $C'$ and $V'$, secured upon the said shaft, the arm $F'$, loose upon the shaft and having lugs F² upon its sleeve, the spring H, projecting between said lugs and retaining the arm in position, a cam secured to the shaft for raising the spring and freeing the arm F' when the shaft has partially revolved, a lug projecting from the cam and bearing against one of the lugs on said sleeve, and the spring I and link E, connected to the cam for raising the arms to their original positions, substantially as and for the purpose set forth.

5. In a harvester, the combination of a supporting-frame secured to the binder-deck, the shaft C, having a bent central portion and journaled in brackets B, the arm C', the arm V', provided with a tail, V³, the slotted link S, connecting said tail with the trip mechanism, the arm F', loose on shaft C and having lugs F² upon its sleeve, the spring H, projecting between said lugs and retaining the arm in position, and a cam secured to the shaft for raising the spring and freeing the arm F' when the shaft has partially revolved, substantially as and for the purpose set forth.

JACOB BACHMAN.

Witnesses:
  E. H. COLDREN,
  WM. A. H. SCHMEHL.